(12) United States Patent
Liu

(10) Patent No.: US 11,974,073 B2
(45) Date of Patent: Apr. 30, 2024

(54) METHOD AND APPARATUS FOR HANDLING ABNORMAL VIDEO CALL, AND COMMUNICATION DEVICE AND STORAGE MEDIUM

(71) Applicant: Beijing Xiaomi Mobile Software Co., Ltd., Beijing (CN)

(72) Inventor: Yongqi Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/899,985

(22) Filed: Aug. 31, 2022

(65) Prior Publication Data

US 2023/0344964 A1 Oct. 26, 2023

(30) Foreign Application Priority Data

Apr. 22, 2022 (CN) .......................... 202210429526.6

(51) Int. Cl.
*H04N 7/14* (2006.01)
*H04L 12/18* (2006.01)

(52) U.S. Cl.
CPC ......... *H04N 7/147* (2013.01); *H04L 12/1827* (2013.01)

(58) Field of Classification Search
CPC combination set(s) only.
See application file for complete search history.

(56) References Cited

U.S. PATENT DOCUMENTS

| 9,237,307 B1* | 1/2016 | Vendrow ................ H04N 7/152 |
| 2021/0051298 A1* | 2/2021 | Atkins .................... H04N 7/147 |

FOREIGN PATENT DOCUMENTS

| CN | 111405622 A | 7/2020 |
| CN | 113543246 A | 10/2021 |

OTHER PUBLICATIONS

Extended European Search Report dated May 23, 2023, in corresponding European Patent Application No. 22196325.9, 11 pages.

* cited by examiner

*Primary Examiner* — Amal S Zenati
(74) *Attorney, Agent, or Firm* — Oblon, McClelland, Maier & Neustadt, L.L.P.

(57) ABSTRACT

The present disclosure relates to a method and an apparatus for handling an abnormal video call, a communication device and a storage medium. A method for handling an abnormal video call can include receiving a measurement configuration message sent by a network device during the video call in a current cell of a first network, determining data reception during the video call and determining a signal quality parameter of the current cell, and not reporting a B1 event in response to the data reception meeting a first condition and the signal quality parameter meeting a second condition.

17 Claims, 5 Drawing Sheets

METHOD AND APPARATUS FOR HANDLING ABNORMAL VIDEO CALL, AND COMMUNICATION DEVICE AND STORAGE MEDIUM

CROSS-REFERENCE TO RELATED APPLICATIONS

This application is based upon and claims priority to Chinese Patent Application No. 202210429526.6, filed on Apr. 22, 2022, the entire content thereof is incorporated herein by reference.

BACKGROUND OF THE INVENTION

Field of the Invention

The present disclosure relates to the field of communication technology, and in particular, to a method and an apparatus for handling an abnormal video call, and a communication device and a storage medium.

Description of the Related Art

With the popularization of high-definition voice services (Voice over LTE, VoLTE) of mobile operators, associated high-definition video calls (Video over LTE, ViLTE) are also rapidly promoted to enhance the voice services. Both VoLTE and ViLTE are services based on Long Term Evolution (LTE) high-speed data networks. VoLTE is a prerequisite for deploying ViLTE, and ViLTE is an extension of VoLTE. A ViLTE operation can establish an additional data transmission bearer for a video media during the establishment of VoLTE, so that users can interact through a video at the same time during a voice call.

In some scenarios in the related art, a fallback from a ViLTE video call to a voice call may affect the user's experience in calling.

SUMMARY OF THE INVENTION

Embodiments of the present disclosure provide a method and an apparatus for handling an abnormal video call, and a communication device and a storage medium.

According to one aspect of embodiments of the present disclosure, a method for handling an abnormal video call is provided, which is applied to user equipment. The method can include receiving a measurement configuration message sent by a network device during the video call in a current cell of a first network, wherein the measurement configuration message is used to instruct the user equipment to measure a signal strength of a CS domain of a second network, and a network standard of the first network is higher than a network standard of the second network, determining data reception during the video call and determining a signal quality parameter of the current cell, and not reporting a B1 event in response to the data reception meeting a first condition and the signal quality parameter meeting a second condition, wherein the B1 event is used to trigger the network device to hand over the video call in the first network to a voice call in the CS domain of the second network, the first condition is used to indicate that a packet loss rate of data received is lower than a set threshold, and the second condition is used to indicate that the signal quality parameter is higher than a corresponding parameter threshold.

In some embodiments, the signal quality parameter of the current cell includes at least one of a signal-to-noise ratio of the current cell, reference signal received power of the current cell, and reference signal received quality of the current cell.

In some embodiments, the determining data reception during the video call includes determining quantity of media data packets received during the video call, and determining reference quantity of media data packets expected to be received during the video call according to sequence numbers of the media data packets received, and determining whether the data reception meets the first condition according to the quantity of media data packets received and the reference quantity.

In some embodiments, the determining whether the data reception meets the first condition according to the quantity of media data packets received and the reference quantity includes determining that the data reception does not meet the first condition in response to difference between the quantity of media data packets received and the reference quantity being not less than a quantity threshold, and determining that the data reception meets the first condition in response to the difference between the quantity of media data packets received and the reference quantity being less than the quantity threshold.

In some embodiments, the determining a signal quality parameter of the current cell includes obtaining the signal quality parameter of the current cell at multiple time points within a preset time period at preset intervals, wherein the preset time period takes time when the measurement configuration message is received as a starting time, and determining whether the signal quality parameter of the current cell meets the second condition.

In some embodiments, the signal quality parameter of the current cell includes a signal-to-noise ratio of the current cell, and the determining whether the signal quality parameter of the current cell meets the second condition includes determining whether the signal quality parameter meets the second condition according to the signal-to-noise ratio.

In some embodiments the determining whether the signal quality parameter meets the second condition according to the signal-to-noise ratio includes:

in response to the average value of the signal-to-noise ratio being higher than the signal-to-noise ratio threshold within a preset time period, it is determined that the signal quality parameter satisfies the second condition;

in response to an average value of the signal-to-noise ratio within the preset time period being higher than a signal-to-noise ratio threshold, determining that the signal quality parameter meets the second condition; and in response to the average value of the signal-to-noise ratio within the preset time period being not higher than the signal-to-noise ratio threshold, determining whether the signal quality parameter meets the second condition according to reference signal received power of the current cell and/or reference signal received quality of the current cell:

in response to an average value of the reference signal received power within the preset time period being higher than a received power threshold, and an average value of the reference signal received quality being higher than a received quality threshold, determining that the signal quality parameter meets the second condition; and in response to the average value of the reference signal received power within the preset time period being not higher than the received power threshold, and/or the average value of the reference signal received quality being not higher than the received quality threshold, determining that the signal quality parameter does not meet the second condition.

In some embodiments, the method further includes reporting the B1 event in response to the data reception not meeting the first condition, and/or the signal quality parameter not meeting the second condition.

According to another aspect of embodiments of the present disclosure, a method for handling an abnormal video call is provided, which is applied to a network device, and the method includes sending a measurement configuration message to user equipment, wherein the measurement configuration message is used to instruct the user equipment to measure a signal strength of a CS domain of a second network during the video call in a current cell of a first network, and maintaining the video call of the user equipment in the first network in response to not receiving a B1 event reported by the user equipment, wherein the user equipment does not report the B1 event in response to data reception during the video call meets a first condition and a signal quality parameter of the current cell meets a second condition, and wherein the B1 event is used to trigger the network device to hand over the video call in the first network to a voice call in the CS domain of the second network, the first condition is used to indicate that a packet loss rate of data received is lower than a set threshold, and the second condition is used to indicate that the signal quality parameter is higher than a corresponding parameter threshold.

In some embodiments, the method further includes handing over the video call of the user equipment in the first network to the voice call in the CS domain of the second network in response to receiving the B1 event reported by the user equipment, wherein the user equipment reports the B1 event in response to the data reception not meeting the first condition, and/or the signal quality parameter not meeting the second condition.

According to another aspect of embodiments of the present disclosure, an apparatus for handling an abnormal video call is provided, which is applied to user equipment, and the apparatus includes a receiving module configured to receive a measurement configuration message sent by a network device during the video call in a current cell of a first network, wherein the measurement configuration message is used to instruct the user equipment to measure a signal strength of a CS domain of a second network, and a network standard of the first network is higher than a network standard of the second network a determination module configured to determine data reception during the video call and determining a signal quality parameter of the current cell, and an execution module configured to not report a B1 event in response to the data reception meeting a first condition and the signal quality parameter meeting a second condition, wherein the B1 event is used to trigger the network device to hand over the video call in the first network to a voice call in the CS domain of the second network, the first condition is used to indicate that a packet loss rate of data received is lower than a set threshold, and the second condition is used to indicate that the signal quality parameter is higher than a corresponding parameter threshold.

According to another aspect of embodiments of the present disclosure, an apparatus for handling an abnormal video call is provided, which is applied to a network device, and the apparatus includes a sending module configured to send a measurement configuration message to user equipment, wherein the measurement configuration message is used to instruct the user equipment to measure a signal strength of a CS domain of a second network during the video call in a current cell of a first network, and a handling module configured to maintain the video call of the user equipment in the first network in response to not receiving a B1 event reported by the user equipment, wherein the user equipment does not report the B1 event in response to data reception during the video call meets a first condition and a signal quality parameter of the current cell meets a second condition, and wherein the B1 event is used to trigger the network device to hand over the video call in the first network to a voice call in the CS domain of the second network, the first condition is used to indicate that a packet loss rate of data received is lower than a set threshold, and the second condition is used to indicate that the signal quality parameter is higher than a corresponding parameter threshold.

According to another aspect of embodiments of the present disclosure, a communication device is provided, which includes a processor and a memory for storing instructions executable by the processor. The processor is configured to implement the method for handling an abnormal video call as described in any one of the above aspects.

According to another aspect of embodiments of the present disclosure, a non-transitory computer-readable storage medium is provided, when instructions in the storage medium are executed by a processor of a communication device, the communication device is enabled to implement the method for handling an abnormal video call as described in any one of the above aspects.

The technical solutions of embodiments of the present disclosure may provide beneficial effects, including, according to embodiments of the present disclosure, after receiving the measurement configuration message from the network device, the user equipment can not only measure the signal strength of the neighboring inter RAT cell, but also determine the data reception during the video call and the signal quality parameter of the current cell, so that the user equipment can reduce the number of times of reporting the B1 event in combination with the determination of an actual communication situation of a current network and a state of a network of other standards. As a result, a problem that a call falls back to a voice call in the CS domain from the ViLTE video call in unnecessary scenarios will be effectively improved, and the user experience during the video call can be enhanced.

It should be understood that the foregoing general description and the following detailed description are exemplary and explanatory only and are not restrictive of the present disclosure.

BRIEF DESCRIPTION OF THE DRAWINGS

The drawings which are incorporated in and constitute a part of this specification, illustrate embodiments consistent with the present disclosure and serve together with the specification to explain the principles of the present disclosure.

DETAILED DESCRIPTION OF THE PREFERRED EMBODIMENTS

Figure 1:
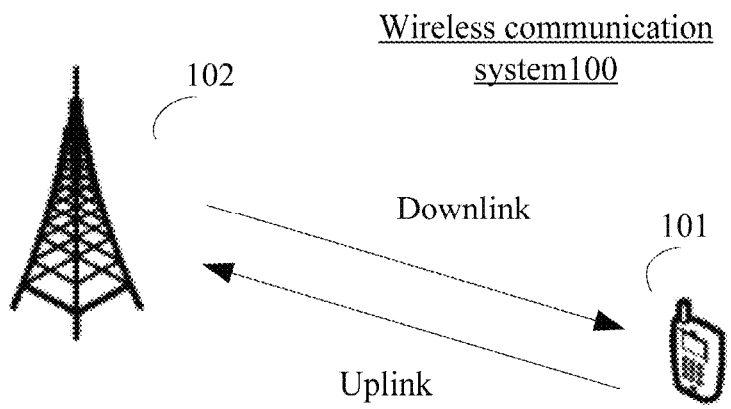
FIG. 1 illustrates a schematic diagram of a wireless communication system according to an exemplary embodiment.

Exemplary embodiments will be described in detail herein, and illustrated in the drawings. When the following descriptions refer to the drawings, the same numerals in different drawings represent the same or similar elements unless otherwise indicated. The implementations described in the illustrative examples below are not intended to represent all implementations consistent with the present disclosure, rather, they are merely examples of apparatus and methods consistent with some aspects of the present disclosure as recited in the appended claims.

In a ViLTE process in the related art, user equipment (UE) may be configured by a network device to perform a signal measurement of a neighboring inter Radio Access Technology (inter-RAT) cell. For example, the user equipment is configured by the network device to perform a measurement of Radio Access Technology (RAT) with a circuit-switched domain (CS domain). The RAT with a CS domain includes: Global System for Mobile Communications (GSM) namely the second generation (2G) mobile communication technology, and Wideband Code Division Multiple Access (WCDMA) namely the third generation (3G) mobile communication technology.

When measuring that a signal strength of the CS domain meets measurement configuration conditions, the UE will report a B1 event to the network device, thereby triggering the network device to initiate a handover of the UE from LTE (4G) to the CS domain of GSM or WCDMA. During a handover process, a video bearer cannot continue to be maintained in the CS domain, and the call will fall back from a video call to a voice call, which enables the continuity of the voice service to be completed. Herein, the B1 event indicates that the signal strength of the neighboring inter-RAT cell is stronger than an absolute threshold, and the LTE on which ViLTE is based, the CS domain of GSM, and the CS domain of WCDMA belong to inter Radio Access Technology.

The communication between the user equipment and the network device mentioned above complies with the communication protocol. However, during some actual situations, when configuring the UE to measure the signal strength of the CS domain, the network device does not examine a current communication situation under LTE. Reasons that may drive the network device to configure the signal strength measurement in the CS domain includes, poor LTE signals unable to provide the ViLTE service normally, load balancing of the network device, and existence of a GSM base station or a WCDMA base station near the UE.

For example, when both the signal strength and the signal-to-noise ratio of LTE meet requirements for a video call, the network device still configures the signal strength measurement of the neighboring inter-RAT cell, and the UE still reports the B1 event according to a measurement result. The network device will eventually hand over the UE from LTE to the CS domain of GSM or WCDMA, resulting a fallback from a video call to a voice call in places with good LTE signal coverage, which seriously affects the good experience during the video call.

In order to solve above problem in the related art, where the video call abnormally falls back to the voice call in the CS domain of GSM or WCDMA in places with good LTE signal coverage, embodiments of the present disclosure provide a method for conducting calls.

As shown in FIG. 1, the method for conducting calls provided by embodiments of the present disclosure may be applied to a wireless communication system 100. The wireless communication system may include user equipment 101 and a network device 102. The user equipment 101 is configured to support carrier aggregation, and the user equipment 101 may be connected to multiple carrier units of the network device 102, including one primary carrier unit and one or more secondary carrier units.

It should be understood that above wireless communication system 100 is applicable to both low frequency scenarios and high frequency scenarios. Application scenarios of the wireless communication system 100 include but are not limited to long term evolution (LTE) systems, LTE frequency division duplex (FDD) systems, LTE time division duplex (TDD) systems, worldwide interoperability for micro wave access (WiMAX) communication system, and cloud radio access network (CRAN) systems, etc.

The user equipment (UE) 101 shown above may be a terminal, an access terminal, a terminal unit, a terminal station, a mobile station (MS), a remote station, a remote terminal, a mobile terminal, a wireless communication device, a terminal agent or a terminal device, etc. The user equipment 101 may have a wireless transceiver function, and can communicate (such as wirelessly communicate) with one or more network devices in one or more communication systems, and receive network services provided by the network device. The network device herein includes but is not limited to illustrated network device 102.

The user equipment 101 may be a cellular phone, a cordless phone, a session initiation protocol (SIP) phone, a wireless local loop (WLL) station, a personal digital assistant (PDA) device, a wireless communication-enabled handheld device, a computing device or other processing devices connected to a wireless modem, a vehicle-mounted device and a wearable device, a terminal device in future 5G network or a terminal device in future evolved PLMN network, etc.

The network device 102 may be an access network device (or an access network site). The access network device refers to a device that provides a network access function, such as a radio access network (RAN) base station, and the like. Specifically, the network device 102 may include a base station (BS), or the network device 102 may include a base station and a radio resource management device for controlling the base station, etc. The network device 102 may further include a relay station (a relay device), an access point, a base station in future 5G network, a base station in future evolved PLMN network or an NR base station, etc. The network device 102 may be a wearable device or a vehicle-mounted device. The network device 102 may also be a communication chip with a communication module.

For example, the network device 102 includes but is not limited to a next-generation gnodeB (gNB) in 5G, an evolved node B (eNB) in the LTE system, a radio network controller (RNC), a node B (NB) in the WCDMA system, a wireless controller in the CRAN system, a basestation controller (BSC), a base transceiver station (BTS) in the GSM system or CDMA system, a home basestation (for example, a home evolved node B, or a home node B, HNB), a baseband unit (BBU), a transmitting and receiving point (TRP), a transmitting point (TP), or a mobile switching center, etc.

Figure 2:
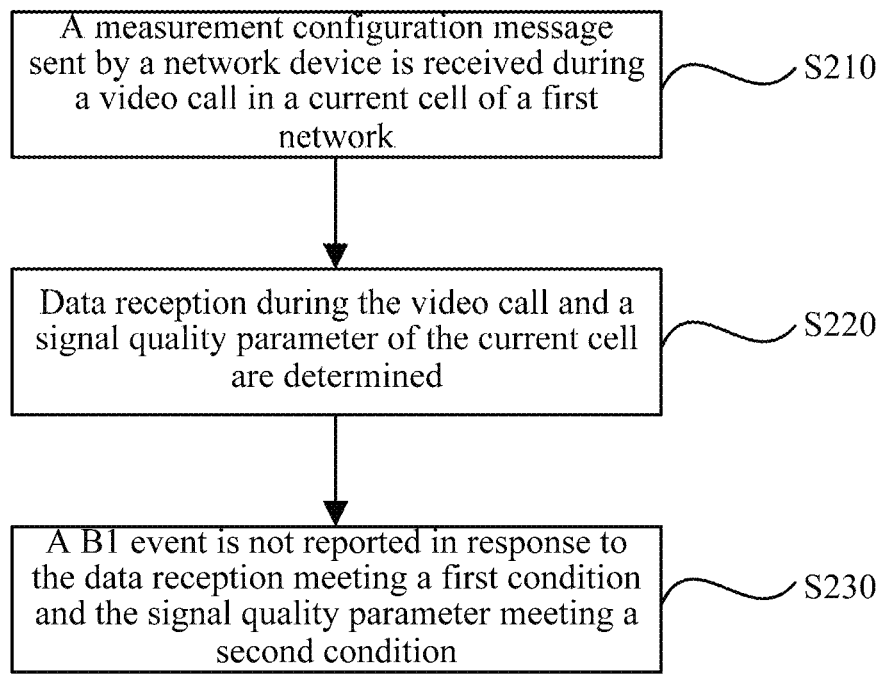
FIG. 2 illustrates a flowchart of a method according to an exemplary embodiment.

In exemplary embodiments, the method for conducting calls according to embodiments of the present disclosure is applied to user equipment (UE). As shown in FIG. 2, the method according to embodiments may include following steps.

In S210, a measurement configuration message sent by a network device is received during a video call in a current cell of a first network.

In S220, data reception during the video call and a signal quality parameter of the current cell are determined.

In S230, a B1 event is not reported in response to the data reception meeting a first condition and the signal quality parameter meeting a second condition.

Herein, in step S210, the measurement configuration message RRCConnectionReconfiguration (measCfg GSM/UTRAN B1 Event) is used to instruct the user equipment to measure a signal strength of a CS domain of a second network, and a network standard of the first network is higher than a network standard of the second network. In this step, after receiving the measurement configuration message from the network device, the user equipment may measure the signal strength of the CS domain of GSM and/or WCDMA nearby a location of the user equipment according to a protocol, for example, measure reference signal received power RSRP of the CS domain.

In this step, the first network refers to, for example, the LTE namely a 4G network, and the second network refers to, for example, a 2G network or a 3G network.

In step S220, in addition to measuring inter RAT parameters based on the protocol, the user equipment according to embodiments will also determine communication parameters involved during the video call. For example, the data reception during the video call, and the signal quality parameter of the current cell of LTE, etc., so as to determine whether the video call is suitable at present. The user equipment may execute this step after receiving the measurement configuration message.

In some examples, the data reception may be determined based on quantity of media data packets received in a downlink during the video call. The media data packets include Real-time Transport Protocol (RIP) packets of a video media during a ViLTE video call. The quantity of media data packets received can represent actual situations of sending and receiving of video media data.

In some other examples, the signal quality parameter of the current cell includes at least one of a signal-to-noise ratio (SNR) of the current cell, reference signal received power (RSRP) of the current cell, and reference signal received quality (RSRQ) of the current cell. The signal quality parameter of the current cell is used to represent quality of a current radio channel. The SNR can reflect link quality of a current communication channel, and is an important indicator to evaluate performance parameters of LT. The RSRP can reflect path loss intensity of the current communication channel, and can be applied to measure coverage of a cell and selection/reselection and handover of the cell. The RSRQ can reflect and indicate levels of the signal-to-noise ratio and interference of the quality of the current communication channel.

In step S230, the B1 event is used to trigger the network device to hand over the video call in the first network to the voice call in the CS domain of the second network. The first condition is used to indicate that a packet loss rate of data received is lower than a set threshold, and the second condition is used to indicate that the signal quality parameter is higher than a corresponding parameter threshold.

In this step, based on the parameter determined in step S220 and preset decision conditions, whether an actual communication situation during the video call still meets requirements for the ViLTE video call can be determined. When the data reception meets the first condition and the signal quality parameter meets the second condition, it indicates that the current cell of the first network can still meet the requirements for the ViLTE video call, thus it is not necessary to report the B1 event even if the signal strength of the CS domain is stronger than the absolute threshold. As a result, the network device will not be triggered to hand over a network to the CS domain of the second network, and the ViLTE video call in the first network by the user equipment will be maintained.

In other examples of embodiments, when the data reception does not meet the first condition, and/or the signal quality parameter does not meet the second condition, the user equipment may determine that the current cell of LTE is no longer suitable for the ViLTE video call. In such cases, if the signal strength of the CS domain is stronger than the absolute threshold, the user equipment may report the B1 event normally. In some examples, after the B1 event is reported, the network device will be triggered to hand over an access network of the user equipment from the first network to the CS domain of the second network, so as to continue the voice call. As a result, the user equipment will change the call from the ViLTE video call to the voice call in the CS domain.

According to embodiments of the present disclosure, after receiving the measurement configuration message from the network device, the user equipment can not only measure the signal strength of the neighboring inter RAT cell, but also determine the data reception during the video call and the signal quality parameter of the current cell, so that the user equipment can reduce the number of times of reporting the B1 event in combination with the determination of an actual communication situation of a current network and a state of a network of other standards. As a result, a problem that a call falls back to a voice call in the CS domain from the ViLTE video call in unnecessary scenarios will be effectively improved, and the user experience during the video call can be enhanced.

It should be understood that an application scenario in embodiments of the present disclosure is a scenario for a ViLTE video call. However, 5G NR does not support interoperability with 2G or 3G with the CS domain, and a fallback will not occur, thus embodiments of the present disclosure are not applicable to Video over NR (ViNR) scenarios.

Figure 3:
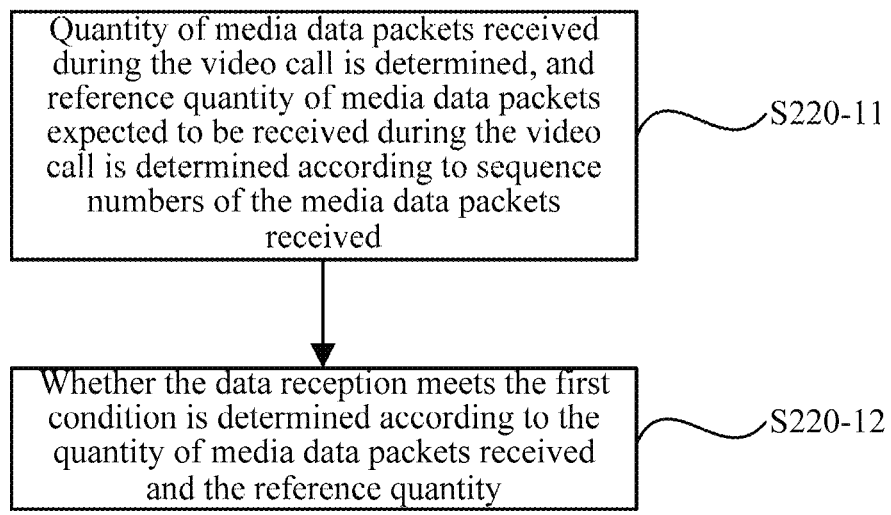
FIG. 3 illustrates a flowchart of a method according to an exemplary embodiment.

In exemplary embodiments, the method according to embodiments may include steps S210 to S230 shown in FIG. 1. A step of determining data reception during the video call may include following steps, as shown in FIG. 3.

In S220-11, quantity of media data packets received during the video call is determined, and reference quantity of media data packets expected to be received during the video call is determined according to sequence numbers of the media data packets received.

In S220-12, whether the data reception meets the first condition is determined according to the quantity of media data packets received and the reference quantity.

According to embodiments, in step S220-11, the user equipment can continuously record the sequence numbers of the media data packets (i.e., RTP packets) received in a downlink from receipt of the measurement configuration message, until a cut-off time for reporting the B1 event is reached.

According to embodiments, the user equipment may determine quantity of RTP packets actually received and record the quantity of RTP packets actually received as current quantity. The user equipment may also determine quantity of RTP packets expected to be received according to sequence numbers of the RIP packets and record the quantity of RTP packets expected to be received as the reference quantity. In some examples, the user equipment may determine the reference quantity according to a maximum of the sequence numbers of the RTP packets. For example, the sequence numbers of the RTP packets received are 1, 2, 3, 5, and 7 in sequence, and the reference quantity can be determined as 7 according to the maximum of 7 of the sequence numbers. In some other examples, the user equipment may determine the reference quantity according to a maximum and a minimum of the sequence numbers of the RTP packets, and calculate the reference quantity as reference quantity=(maximum−minimum)+1. For example, the sequence numbers of the RTP packets received are 1, 2, 3, and 5 in sequence, and the reference quantity can be determined as (5−1)+1=5 according to the maximum of 5 and the minimum of 1 of the sequence numbers.

According to embodiments, in step S220-12, based on different relationships between the reference quantity and the quantity of RTP packets received, whether the data reception meets the first condition is determined.

In some examples, the step S220-12 includes a step S220-121, in which, in response to difference between the quantity of media data packets received and the reference quantity being not less than a quantity threshold, the data reception is determined to fail to meet the first condition. In this step, the difference between the quantity of media data (RTP) packets received and the reference quantity can represent RTP packets lost during a communication process. If the difference between the quantity of RIP packets received and the reference quantity is greater than or equal to a set quantity threshold (which can be denoted as meeting a decision condition A4), it indicates that a severe packet (RTP packets) loss occurs at present. That is, the ViLTE video call is not suitable at present, and the data reception does not meet the first condition.

Figure 6:
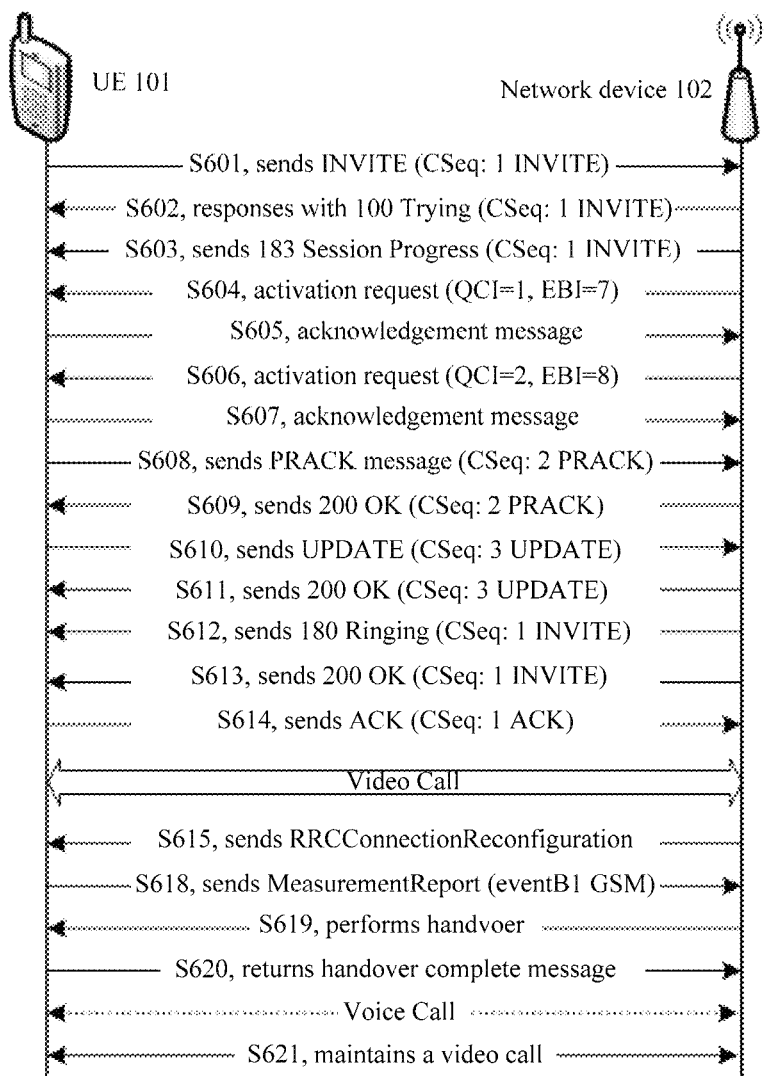
FIG. 6 illustrates a flowchart of an interaction method according to an exemplary embodiment.

In some examples, if the data reception does not meet the first condition, the user equipment may normally report the B1 event to the network device in response to the signal strength of the CS domain being stronger than the absolute threshold, so as to trigger the network device to hand over the first network to the CS domain of the second network. After receiving the B1 event reported by the user equipment, the network device may perform the handover, as shown in FIG. 6, to hand over the user equipment from a current access mode of LTE to the CS domain of GSM or WCDMA. As a result, the user equipment will change the call from the ViLTE video call to the voice call in the CS domain of GSM or WCDMA.

In some other examples, the step S220-12 includes a step S220-122, in which, in response to difference between the quantity of media data packets received and the reference quantity being less than a quantity threshold, the data reception is determined to meet the first condition. In this step, if the difference between the quantity of RTP packets received and the reference quantity is less than the quantity threshold, it indicates that at present the RTP packets are not lost or an occurred packet (RTP packets) loss does not affect the video communication, and the data reception meets the first condition.

In some examples, when the data reception meets the first condition, the user equipment may or may not report the B1 event, which needs to be determined further based on the signal quality parameter of the current cell.

Figure 4:
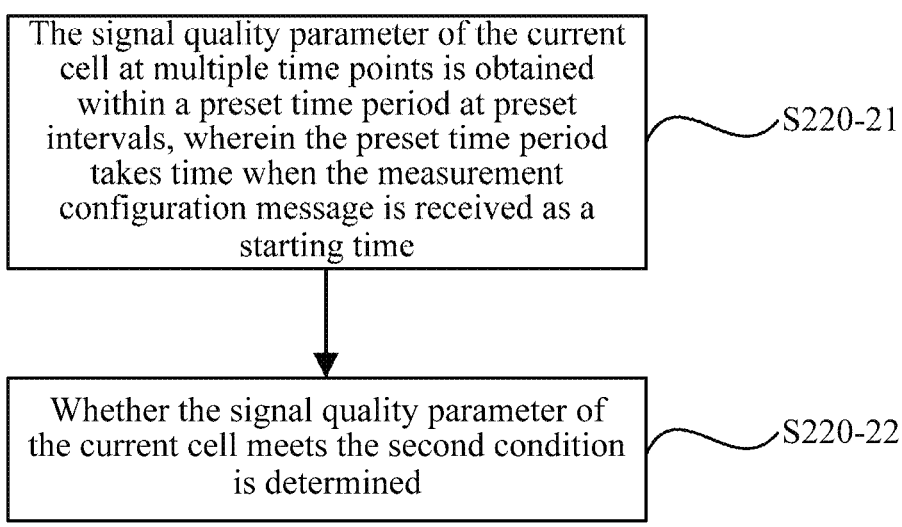
FIG. 4 illustrates a flowchart of a method according to an exemplary embodiment.

In exemplary embodiments, the method according to embodiments may include steps S210 to S230 shown in FIG. 1. A step of determining a signal quality parameter of the current cell may include following steps, as shown in FIG. 4.

In S220-21, the signal quality parameter of the current cell at multiple time points is obtained within a preset time period at preset intervals, herein, the preset time period takes time when the measurement configuration message is received as a starting time.

In S220-22, whether the signal quality parameter of the current cell meets the second condition is determined.

According to embodiments, in the step S220-21, an ending time of the preset time period may be the cut-off time for reporting the B1 event. The user equipment measures from the time when the measurement configuration message is received, multiple signal quality parameters at a preset interval $\Delta t$, that is, measures the signal quality parameter every interval $\Delta t$. It should be understood that if the signal quality parameter of the current cell includes one of the SNR of the current cell, the RSRP of the current cell or the RSRQ of the current cell, then this one signal quality parameter may be measured every interval $\Delta t$; and if the signal quality parameter of the current cell includes more than one parameter, for example includes the SNR of the current cell, the RSRP of the current cell and the RSRQ of the current cell, then the SNR of the current cell, the RSRP of the current cell and the RSRQ of the current cell may be measured every interval $\Delta t$.

According to embodiments, in step S220-22, based on the signal quality parameters collected at multiple time points in step S220-21, for example, based on an average value of the signal quality parameters within the preset time period, whether the signal quality parameter of the current cell meets the second condition is determined.

In some embodiments, the SNR of the current cell can reflect the link quality of the current communication channel, and to a certain extent, can reflect the downlink coding and decoding ability. In some embodiments, among those three signal quality parameters, the SNR of the current cell has the highest priority, and the RSRP of the current cell and the RSRQ of the current cell may have the same priority, which is lower than the priority of the SNR of the current cell.

In some embodiments, in a case where the signal quality parameter of the current cell includes the signal-to-noise ratio (SNR) of the current cell, a step S220-22 may include a step S220-221, in which, whether the signal quality parameter meets the second condition is determined according to the signal-to-noise ratio.

In some examples, the step S220-221 includes following steps.

In response to an average value of the signal-to-noise ratio within the preset time period being higher than a signal-to-noise ratio threshold, the signal quality parameter is determined to meet the second condition. In this step, the average value of SNR can be determined according to multiple SNRs obtained within the preset time period. When the average value of SNR is higher than a preset signal-to-noise ratio threshold, it indicates that the communication quality of the current cell is good and has a high downlink decoding success rate. The signal quality parameter can thus be determined to meet the second condition.

In combination with foregoing embodiments, when the data reception meets the first condition and the signal quality parameter meets the second condition, the user equipment in examples does not report the B1 event to the network device, so that the ViLTE video call in the first network can be maintained.

in some other examples, the step S220-221 includes following steps.

In response to the average value of the signal-to-noise ratio within the preset time period being not higher than the signal-to-noise ratio threshold, reference signal received power of the current cell and/or reference signal received quality of the current cell are/is determined. In this step, in a case where the average value of SNR is equal to or less than the signal-to-noise ratio threshold, the RSRP of the current cell and/or the RSRQ of the current cell can be used as an auxiliary condition, and whether the signal quality parameter of the current cell meets the second condition can be determined based on the RSRP of the current cell and/or the RSRQ of the current cell collected in step S220-21.

For example, in response to an average value of the reference signal received power within the preset time period being higher than a received power threshold, and an average value of the reference signal received quality being higher than a received quality threshold, the signal quality parameter is determined to meet the second condition. In some embodiments, when the average value of SNR is equal to or less than the signal-to-noise ratio threshold (which can be denoted as meeting a decision condition A3), if both the average value of the RSRP of the current cell and the average value of the RSRQ of the current cell are higher than corresponding parameter thresholds, the signal quality parameter is still determined to meet the second condition. When the data reception meets the first condition and the signal quality parameter meets the second condition, the user equipment does not report the B1 event to the network device, so that the ViLTE video call in the first network can be maintained.

For another example, in response to the average value of the reference signal received power within the preset time period being not higher than the received power threshold, and/or the average value of the reference signal received quality being not higher than the received quality threshold, the signal quality parameter is determined to fail to meet the second condition. In some embodiments, when the average value of SNR is equal to or less than the signal-to-noise ratio threshold (which can be denoted as meeting the decision condition A3), if the average value of the RSRP of the current cell is lower than or equal to the received power threshold (which can be denoted as meeting a decision condition A1), or the average value of the RSRQ of the current cell is lower than or equal to the received quality threshold (which can be denoted as meeting a decision condition A2), the signal quality parameter is determined to fail to meet the second condition. When the signal quality parameter does not meet the second condition, it indicates that the communication situation of the current cell is not suitable for the ViLTE video call. In such cases, if the signal strength of the CS domain reaches the absolute threshold, the user equipment will normally report the B1 event to the network device. The network device will hand over the user equipment from the first network to the CS domain of the second network, and the user equipment will fall back to the voice call from the video call.

In exemplary embodiments, the method according to embodiments further includes following steps. In response to the data reception not meeting the first condition and/or the signal quality parameter not meeting the second condition, the B1 event is reported. For specific implementations of this step, references may be made to the descriptions in foregoing embodiments, which will not be repeated here.

According to embodiments of the present disclosure, for example, references may be made to embodiments corresponding to FIG. 2 to FIG. 4, communication parameters herein may have priorities as follows: data reception during a video call, a signal-to-noise ratio (SNR) of a current cell, and reference signal received power RSRP of a current cell or reference signal received quality RSRQ of a current cell. According to descriptions of foregoing embodiments, when above-mentioned decision condition A4 is met, or when above-mentioned decision condition A3 and decision condition A1 and/or decision condition A2 are met, the user equipment will directly report the B1 event.

Figure 5:
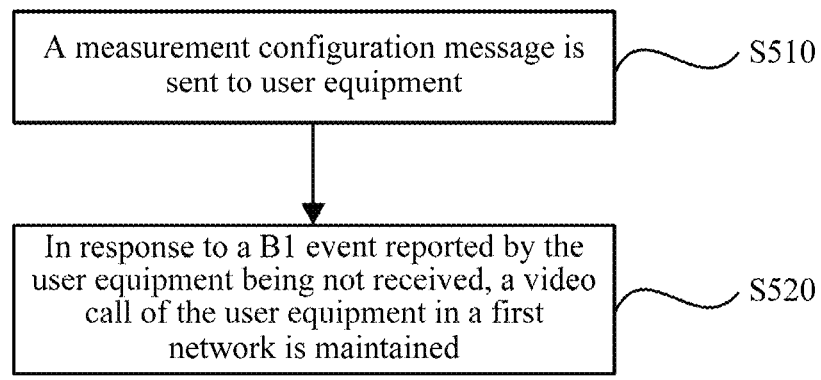
FIG. 5 illustrates a flowchart of a method according to another exemplary embodiment.

In exemplary embodiments, a method for conducting calls according to embodiments of the present disclosure is further provided, and is applied to a network device. As shown in FIG. 5, the method according to embodiments may include following steps.

In S510, a measurement configuration message is sent to user equipment.

In S520, in response to a B1 event reported by the user equipment being not received, a video call of the user equipment in a first network is maintained.

According to embodiments, in step S510, the measurement configuration message is used to instruct the user equipment to measure a signal strength of a CS domain of a second network during the video call in a current cell of a first network. With reference to the descriptions in foregoing embodiments, after receiving the measurement configuration message, the user equipment may determine relevant parameters.

According to embodiments, in step S520, when data reception during the video call meets a first condition and a signal quality parameter of the current cell meets a second condition, the user equipment does not report the B1 event. The B1 event is used to trigger the network device to hand over the video call in the first network to a voice call in the CS domain of the second network. The first condition is used to indicate that a packet loss rate of the data received is lower than a set threshold, and the second condition is used to indicate that the signal quality parameter is higher than a corresponding parameter threshold. In this step, if the network device does not receive the B1 event reported by the user equipment, the network device will not hand over the access network of the user equipment. As a result, the video call of the user equipment in the first network can be maintained.

In exemplary embodiments, the method according to embodiments may further include a step S530.

In S530, in response to the B1 event reported by the user equipment being received, the video call of the user equipment in the first network is handed over to the voice call in the CS domain of the second network. In this step, the user equipment reports the B1 event when the data reception does not meet the first condition and/or the signal quality parameter does not meet the second condition. References may be made to descriptions of the foregoing embodiments for details, which will not be repeated here.

Further descriptions of implementations in embodiments of the present disclosure are shown in FIG. 6. An interaction method between user equipment (UE) 101 and a network device 102 according to embodiments of the present disclosure may include following steps.

In S601, after successfully registering for VoLTE and reporting video ability, the UE 101 sends a video call request (INVITE message) to the network device 102. A video media parameter is carried in the INVITE message to indicate that a call currently initiated is a video call. Herein, the UE 101 in examples is a calling side.

In S602, after receiving the INVITE message, the network device 102 immediately replies to the UE 101 with a 100 Trying message. The 100 Trying message is used to indicate that the INVITE message from the UE 101 has been successfully received and is being forwarded and processed.

In 5603, the network device 102 forwards a preliminary result, i.e., 183 Session Progress message, of the INVITE message handled by a called side. The 183 Session Progress message is used for negotiating media parameters with the UE 101, such as negotiating a coding format.

In S604, the network device 102 sends an activation request (Activate Dedicated Eps Bearer Context Request) to activate for the UE 101, a voice dedicated bearer with Quality of Service Class Identifier (QCI)=1, which is used for subsequent sending and receiving of voice media data.

In S605, the UE 101 sends an acknowledgement message (Activate Dedicated Eps Bearer Context Accept) for activated voice dedicated bearer message with QCI=1.

In S606, the network device 102 sends an activation request (Activate Dedicated Eps Bearer Context Request) to activate for the UE 101, a video dedicated bearer with QCI=2, which is used for subsequent sending and receiving of video media data.

In S607, the UE 101 sends an acknowledgement message (Activate Dedicated Eps Bearer Context Accept) for activated video dedicated bearer message with QCI=2.

In S608, the UE 101 sends a PRACK message for acknowledgement of a 183 Session Progress message.

In S609: the network device 102 delivers a 200 OK message for the PRACK, which is used to acknowledge receiving of the PRACK message.

In S610, the UE 101 updates a current video call establishment state by sending an UPDATE message, so as to notify the called side through the network device 102. This step is convenient for confirming that the QCI bearers of the calling side and the called side have been established.

In S611, the called side acknowledges the UPDATE message through the 200 OK message sent by the network device 102 to update the video call establishment state of the called side.

In S612, the UE 101 receives a 180 Ringing message, indicating that at present voice and video bearers have been established at both ends, and a video call can be answered at any time.

In S613: the UE 101 receives an off-hook answering message 200 OK of the called side sent by the network device 102.

In S614, the UE101 sends an ACK message to acknowledge the received 200 OK message, after which the video call is successfully established.

In S615, during the video call, the UE 101 and the network device 102 are in an RRC connection state. In the RRC connection state, the mobility management of the UE 101 is dominated by the network device 102. The network device 102 delivers various measurement configuration events according to the deployment of the network, the measurement report reported by the UE, and the network decision.

For example, in this step, the network device 102 delivers a measurement configuration message to perform B1 event measurement (measCfg GSM B1 Event), that is, to measure the signal strength of the CS domain of the second network, and determine that the target RAT is GSM (geran) or WCDMA (utran).

In S616, according to the received measurement configuration message, the UE 101 determines the data reception during the video call, the signal quality parameter of the current cell, and the measurement result of the CS domain of the second network. For example, the target RAT is GSM, i.e., 2G.

In S617, according to descriptions in the foregoing embodiments corresponding to FIG. 2 to FIG. 4, the UE 101 determines whether to report the B1 event. If the UE 101 determines to report the B1 event, go to a step S618 to a step S620, and if not, go to a step S621.

In S618, the UE 101 reports the measurement result of the CS domain, indicating that the target RAT is geran or utran.

In S619, the network device 102 performs the handover according to the reported measurement result, and hands over the UE 101 from current LTE access mode to the CS domain of the target RAT, that is,
MobilityFromEUTRACommand(handover(targetRAT-Type:geran)).

In S620, the UE 101 returns a handover complete message. So far, the access mode of UE101 has fallen back to the CS domain (CS RAT) from LTE, and ViLTE video calls/calling have; has also automatically fallen back to voice calls/calling (Voice Call).

In S621, the ViLTE video call is maintained (Video Call).

According to embodiments of the present disclosure, whether it is necessary to report the B1 event at present can be accurately determined based on actual communication situations of the UE 101 during the ViLTE video call. As a result, a decision whether to perform the handover from the ViLTE video call to the voice call in the CS domain is made by the UE 101 side, so as to optimize a configuration of the B1 event by the network device 102, to reduce the abnormal fallback of the UE 101 from the ViLTE video call to the voice call in the CS domain, and to improve the user experience during the ViLTE video call.

It should be understood that the user equipment may be both the calling side and the called side, and the scenario illustrated in embodiments takes the user equipment as the calling side as an example.

Figure 7:
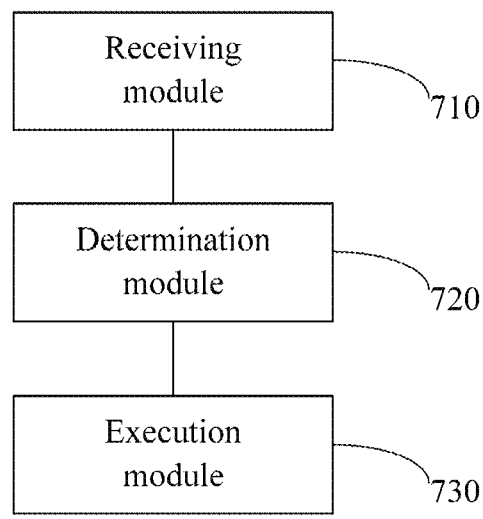
FIG. 7 illustrates a block diagram of an apparatus according to an exemplary embodiment.

In exemplary embodiments, an apparatus for conducting calls is further provided, which is applied to user equipment. As shown in FIG. 7, the apparatus according to embodiments includes a receiving module 710, a determination module 720 and an execution module 730. The apparatus according to embodiments is used to implement the method performed by the user equipment as shown in FIG. 2 to FIG. 4. The receiving module 710 is configured to receive a measurement configuration message sent by a network device during the video call in a current cell of a first network, wherein the measurement configuration message is used to instruct the user equipment to measure a signal strength of a CS domain of a second network, and a network standard of the first network is higher than a network standard of the second network. The determination module 720 is configured to determine data reception during the video call and determining a signal quality parameter of the current cell. The execution module 730 is configured to not report a B1 event in response to the data reception meeting a first condition and the signal quality parameter meeting a second condition, wherein the B1 event is used to trigger the network device to hand over the video call in the first network to a voice call in the CS domain of the second network, the first condition is used to indicate that a packet loss rate of the data received is lower than a set threshold, and the second condition is used to indicate that the signal quality parameter is higher than a corresponding parameter threshold.

Figure 8:
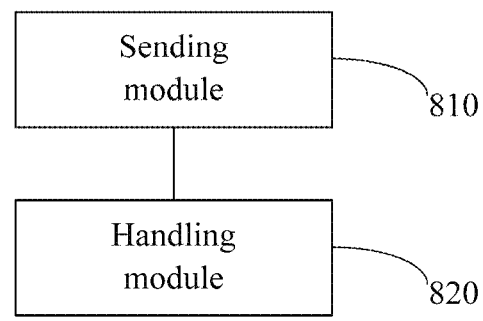
FIG. 8 illustrates a block diagram of an apparatus according to another exemplary embodiment.

In exemplary embodiments, an apparatus for conducting calls is further provided, which is applied to a network device. As shown in FIG. 8, the apparatus according to embodiments includes a sending module 810 and a handling module 820. The apparatus according to embodiments is used to implement the method performed by the network device as shown in FIG. 5. The sending module 810 is configured to send a measurement configuration message to user equipment, wherein the measurement configuration message is used to instruct the user equipment to measure a signal strength of a CS domain of a second network during the video call in a current cell of a first network. The handling module 820 is configured to maintain the video call of the user equipment in the first network in response to not receiving a B1 event reported by the user equipment, wherein the user equipment does not report the B1 event in response to data reception during the video call meets a first condition and a signal quality parameter of the current cell meets a second condition, and wherein the B1 event is used to trigger the network device to hand over the video call in the first network to a voice call in the CS domain of the second network, the first condition is used to indicate that a packet loss rate of the data received is lower than a set threshold, and the second condition is used to indicate that the signal quality parameter is higher than a corresponding parameter threshold.

Some embodiments of the present disclosure also provide a communication device, including a processor, and a memory for storing instructions executable by the processor. The processor is configured to implement above-mentioned method performed by the user equipment, or to implement above-mentioned method performed by the network device.

Figure 9:
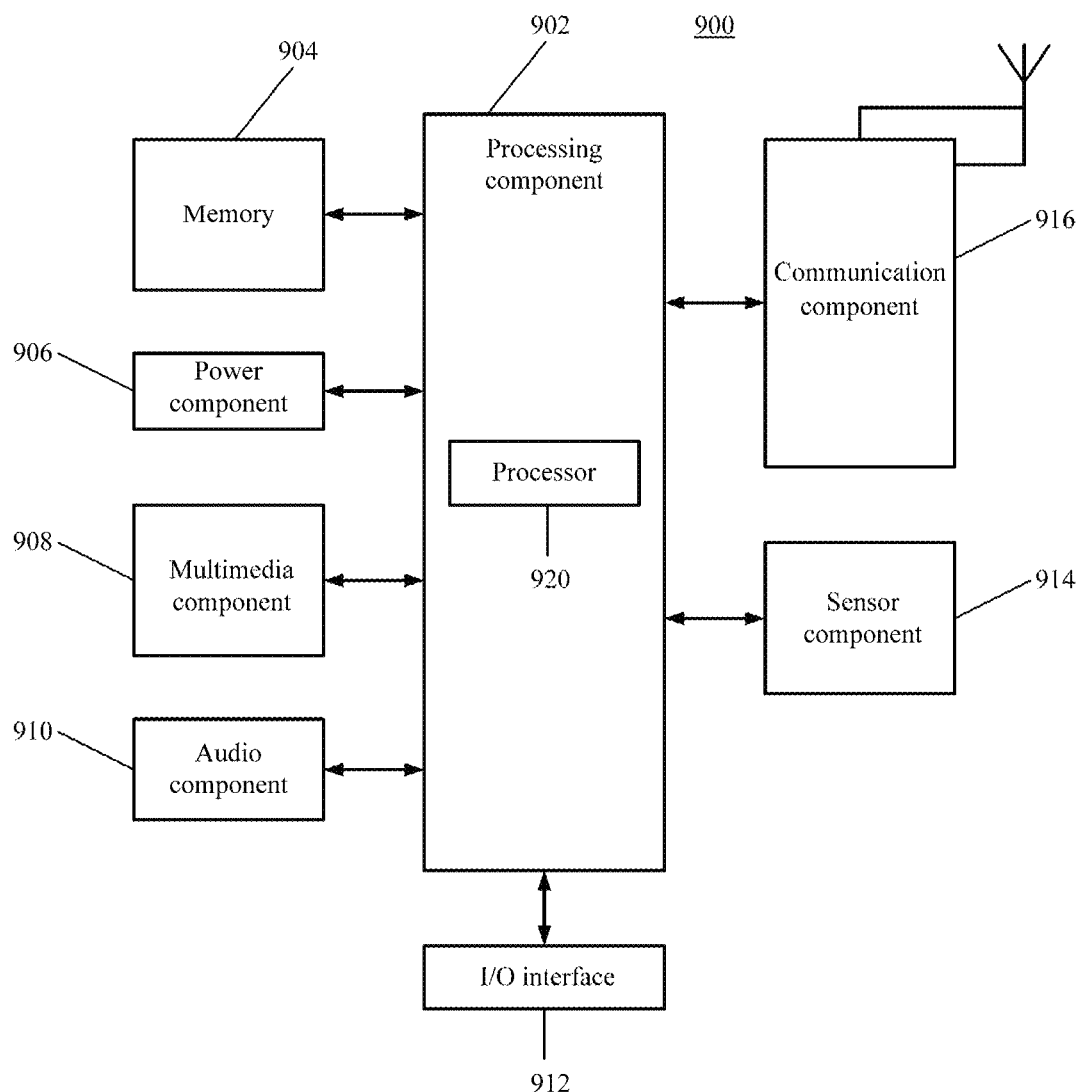
FIG. 9 illustrates a block diagram of user equipment according to an exemplary embodiment.

FIG. 9 illustrates a block diagram of user equipment. Some embodiments of the present disclosure also provide a type of user equipment. For example, a device 900 may be a mobile phone, a computer, a digital broadcast terminal, a messaging device, a game console, a tablet device, a medical device, a fitness device, a personal digital assistant, and the like.

The device 900 may include one or more of following components: a processing component 902, a memory 904, a power component 906, a multimedia component 908, an audio component 910, an input/output (I/O) interface 912, a sensor component 914, and a communication component 916.

The processing component 902 generally controls the overall operation of the device 900, such as operations associated with display, phone calls, data communications, camera operations, and recording operations. The processing component 902 may include one or more processors 920 to execute instructions to perform all or some of the steps of the methods described above. Additionally, the processing component 902 may include one or more modules to facilitate interaction between the processing component 902 and other components. For example, processing component 902 may include a multimedia module to facilitate interaction between the multimedia component 908 and the processing component 902. The memory 904 is configured to store various types of data to support operations in device 900. Examples of such data include instructions for any application or method operating on device 900, contact data, phonebook data, messages, pictures, videos, and the like. The memory 904 may be implemented through any type of volatile or nonvolatile storage devices or combination thereof, such as static random access memory (SRAM), electrically erasable programmable read only memory (EEPROM), erasable programmable read only memory (EPROM), programmable read only memory (PROM), read only memory (ROM), magnetic memory, Flash memory, magnetic disk or optical disk.

The power component 906 provides power to various components of device 900. The power component 906 may include a power management system, one or more power sources, and other components associated with generating, managing, and distributing power for device 900.

The multimedia component 908 includes a screen that provides an output interface between device 900 and a user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touch, swipe, and gestures on the touch panel. A touch sensor can sense not only boundaries of a touch or a swipe action, but also duration and pressure associated with the touch or swipe action. In some embodiments, the multimedia component 908 includes a front camera and/or a rear camera. When device 900 is in an operating mode, such as a shooting mode or a video mode, the front camera and/or the rear camera may receive external multimedia data. Each of the front and rear cameras can be a fixed optical lens system or have a focal length and optical zoom ability.

The audio component 910 is configured to output and/or input audio signals. For example, the audio component 910 includes a microphone (MIC) that is configured to receive external audio signals when device 900 is in operating modes, such as a calling mode, a recording mode, and a voice recognition mode. The received audio signal may be further stored in memory 904 or transmitted via communication component 916. In some embodiments, the audio component 910 further includes a speaker for outputting audio signals.

The I/O interface 912 provides an interface between the processing component 902 and peripheral interface modules. The peripheral interface modules may be keyboards, click wheels, buttons, and the like. These buttons may include, but are not limited to a home button, a volume button, a start button, and a lock button.

The sensor component 914 includes one or more sensors for providing state assessments of various aspects of device 900. For example, the sensor component 914 can detect the open/closed state of device 900, the relative positioning of components, such as the display and the keypad of device 900. The sensor component 914 can also detect a change in a position of device 900 or a component of device 900, presence or absence of contact between the user and the device 900 orientation or acceleration/deceleration of the device 900 and temperature change of the device 900. The sensor component 914 may include a proximity sensor configured to detect the presence of nearby objects in the absence of any physical contact. The sensor component 914 may also include a light sensor, such as a CMOS or CCD image sensor, for use in imaging applications. In some embodiments, the sensor component 914 may also include an acceleration sensor, a gyroscope sensor, a magnetic sensor, a pressure sensor, or a temperature sensor.

The communication component 916 is configured to facilitate wired or wireless communication between device 900 and other devices. Device 900 may access a wireless network based on communication standards, such as WiFi, 2G or 3G, or a combination thereof. In exemplary embodiments, the communication component 916 receives broadcast signals or broadcast related information from an external broadcast management system via a broadcast channel In exemplary embodiments, the communication component 916 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In exemplary embodiments, device 900 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components, for implementing the method described above.

Some other exemplary embodiments of the present disclosure provide a non-transitory computer-readable storage medium, such as a memory 904 including instructions that can be executed by a processor 920 of device 900 to implement above method. For example, the computer-readable storage medium may be a ROM, a random access memory (RAM), a CD-ROM, a magnetic tape, a floppy disk, an optical data storage device, and the like. When the instructions in the storage medium are executed by the processor of the user equipment, the user equipment is enabled to perform above method.

Other embodiments of the present disclosure will readily occur to those skilled in the art upon consideration of the specification and practice disclosed herein. The present disclosure is intended to cover any variations, uses, or adaptations of the disclosure that follow the general principles of the disclosure and include common knowledge or conventional technical means in the art not disclosed by the disclosure. The specification and embodiments are to be regarded as exemplary only, with the true scope and spirit of the disclosure being indicated by the appended claims.

It should be understood that the present disclosure is not limited to the precise structures described above and illustrated in the drawings, and that various modifications and changes may be made without departing from its scope. The scope of the present disclosure is limited only by the appended claims.

The invention claimed is:

1. A method for handling an abnormal video call, applied to user equipment, comprising:
receiving a measurement configuration message sent by a network device during the video call in a current cell of a first network, wherein the measurement configuration message is used to instruct the user equipment to measure a signal strength of a circuit-switched, CS, domain of a second network, and a network standard of the first network is higher than a network standard of the second network;
determining data reception during the video call and determining a signal quality parameter of the current cell, wherein the signal quality parameter of the current cell is obtained through measurement by the user equipment in the current cell, and comprises at least one of a signal-to-noise ratio of the current cell, reference signal received power of the current cell, and reference signal received quality of the current cell; and
preventing reporting of a B1 event in response to the data reception meeting a first condition and the signal quality parameter meeting a second condition, wherein the B1 event is used to trigger the network device to hand over the video call in the first network to a voice call in the CS domain of the second network, the first condition is used to indicate that a packet loss rate of data received is lower than a set threshold, and the second condition is used to indicate that the signal quality parameter is higher than a corresponding parameter threshold.

2. The method for handling an abnormal video call according to claim 1, wherein said determining data reception during the video call comprises:
determining quantity of media data packets received during the video call, and determining reference quantity of media data packets expected to be received during the video call according to sequence numbers of the media data packets received; and
determining whether the data reception meets the first condition according to the quantity of media data packets received and the reference quantity.

3. The method for handling an abnormal video call according to claim 2, wherein said determining whether the data reception meets the first condition according to the quantity of media data packets received and the reference quantity comprises:
determining that the data reception does not meet the first condition in response to difference between the quantity of media data packets received and the reference quantity being not less than a quantity threshold; and
determining that the data reception meets the first condition in response to the difference between the quantity of media data packets received and the reference quantity being less than the quantity threshold.

4. The method for handling an abnormal video call according to claim 1, wherein said determining a signal quality parameter of the current cell comprises:
obtaining the signal quality parameter of the current cell at multiple time points within a preset time period at preset intervals, wherein the preset time period takes time when the measurement configuration message is received as a starting time; and
determining whether the signal quality parameter of the current cell meets the second condition.

5. The method for handling an abnormal video call according to claim 4, wherein the signal quality parameter of the current cell comprises a signal-to-noise ratio of the current cell, and said determining whether the signal quality parameter of the current cell meets the second condition comprises:
determining whether the signal quality parameter meets the second condition according to the signal-to-noise ratio.

6. The method for handling an abnormal video call according to claim 5, wherein said determining whether the signal quality parameter meets the second condition according to the signal-to-noise ratio comprises:
in response to an average value of the signal-to-noise ratio within the preset time period being higher than a signal-to-noise ratio threshold, determining that the signal quality parameter meets the second condition; and in response to the average value of the signal-to-noise ratio within the preset time period being not higher than the signal-to-noise ratio threshold, determining whether the signal quality parameter meets the second condition according to reference signal received power of the current cell and/or reference signal received quality of the current cell:

in response to an average value of the reference signal received power within the preset time period being higher than a received power threshold, and an average value of the reference signal received quality being higher than a received quality threshold, determining that the signal quality parameter meets the second condition; and in response to the average value of the reference signal received power within the preset time period being not higher than the received power threshold, and/or the average value of the reference signal received quality being not higher than the received quality threshold, determining that the signal quality parameter does not meet the second condition.

7. The method for handling an abnormal video call according to claim 1, further comprising:

reporting the B1 event in response to the data reception not meeting the first condition, and/or the signal quality parameter not meeting the second condition.

8. A non-transitory computer-readable storage medium, wherein when instructions in the storage medium are executed by a processor of a communication device, the communication device is enabled to implement the method for handling an abnormal video call according to claim 1.

9. A method for handling an abnormal video call, applied to a network device, comprising:

sending a measurement configuration message to user equipment, wherein the measurement configuration message is used to instruct the user equipment to measure a signal strength of a circuit-switched, CS, domain of a second network during the video call in a current cell of a first network, wherein the signal quality parameter of the current cell is obtained through measurement by the user equipment in the current cell, and comprises at least one of a signal-to-noise ratio of the current cell, reference signal received power of the current cell, and reference signal received quality of the current cell; and maintaining the video call of the user equipment in the first network in response to not receiving a B1 event reported by the user equipment, wherein the user equipment is prevented from reporting the B1 event in response to data reception during the video call meets a first condition and a signal quality parameter of the current cell meets a second condition, and wherein the B1 event is used to trigger the network device to hand over the video call in the first network to a voice call in the CS domain of the second network, the first condition is used to indicate that a packet loss rate of data received is lower than a set threshold, and the second condition is used to indicate that the signal quality parameter is higher than a corresponding parameter threshold.

10. The method for handling an abnormal video call according to claim 9, further comprising:

handing over the video call of the user equipment in the first network to the voice call in the CS domain of the second network in response to receiving the B1 event reported by the user equipment, wherein the user equipment reports the B1 event in response to the data reception not meeting the first condition, and/or the signal quality parameter not meeting the second condition.

11. A communication device, comprising:
a processor; and
a memory for storing instructions executable by the processor;
wherein the processor is configured to:

receive a measurement configuration message sent by a network device during the video call in a current cell of a first network, wherein the measurement configuration message is used to instruct the user equipment to measure a signal strength of a circuit-switched, CS, domain of a second network, and a network standard of the first network is higher than a network standard of the second network;

determine data reception during the video call and determine a signal quality parameter of the current cell, wherein the signal quality parameter of the current cell is obtained through measurement by the user equipment in the current cell, and comprises at least one of a signal-to-noise ratio of the current cell, reference signal received power of the current cell, and reference signal received quality of the current cell; and prevent reporting of a B1 event in response to the data reception meeting a first condition and the signal quality parameter meeting a second condition, wherein the B1 event is used to trigger the network device to hand over the video call in the first network to a voice call in the CS domain of the second network, the first condition is used to indicate that a packet loss rate of data received is lower than a set threshold, and the second condition is used to indicate that the signal quality parameter is higher than a corresponding parameter threshold.

12. The communication device according to claim 11, wherein the processor is further configured to:

determine quantity of media data packets received during the video call, and determine reference quantity of media data packets expected to be received during the video call according to sequence numbers of the media data packets received; and determine whether the data reception meets the first condition according to the quantity of media data packets received and the reference quantity.

13. The communication device according to claim 12, wherein the processor is further configured to:

determine that the data reception does not meet the first condition in response to difference between the quantity of media data packets received and the reference quantity being not less than a quantity threshold; and determine that the data reception meets the first condition in response to the difference between the quantity of media data packets received and the reference quantity being less than the quantity threshold.

14. The communication device according to claim 11, wherein the processor is further configured to:

obtain the signal quality parameter of the current cell at multiple time points within a preset time period at preset intervals, wherein the preset time period takes time when the measurement configuration message is received as a starting time; and determine whether the signal quality parameter of the current cell meets the second condition.

15. The communication device according to claim 14, wherein the signal quality parameter of the current cell comprises a signal-to-noise ratio of the current cell, and the processor is further configured to:

determine whether the signal quality parameter meets the second condition according to the signal-to-noise ratio.

16. The communication device according to claim 15, wherein the processor is further configured to:

in response to an average value of the signal-to-noise ratio within the preset time period being higher than a signal-to-noise ratio threshold, determine that the signal quality parameter meets the second condition; and in response to the average value of the signal-to-noise ratio within the preset time period being not higher than the signal-to-noise ratio threshold, determine whether the signal quality parameter meets the second condition according to reference signal received power of the current cell and/or reference signal received quality of the current cell:

in response to an average value of the reference signal received power within the preset time period being higher than a received power threshold, and an average value of the reference signal received quality being higher than a received quality threshold, determine that the signal quality parameter meets the second condition; and in response to the average value of the reference signal received power within the preset time period being not higher than the received power threshold, and/or the average value of the reference signal received quality being not higher than the received quality threshold, determine that the signal quality parameter does not meet the second condition.

17. The communication device according to claim 11, wherein the processor is further configured to:

report the B1 event in response to the data reception not meeting the first condition, and/or the signal quality parameter not meeting the second condition.

\* \* \* \* \*